US008930492B2

(12) United States Patent
Brown et al.

(10) Patent No.: US 8,930,492 B2
(45) Date of Patent: Jan. 6, 2015

(54) METHOD AND ELECTRONIC DEVICE FOR CONTENT SHARING

(75) Inventors: Michael Stephen Brown, Kitchener (CA); Herbert Anthony Little, Waterloo (CA)

(73) Assignee: BlackBerry Limited, Waterloo (CA)

(*) Notice: Subject to any disclaimer, the term of this patent is extended or adjusted under 35 U.S.C. 154(b) by 9 days.

(21) Appl. No.: 13/399,621

(22) Filed: Feb. 17, 2012

(65) Prior Publication Data

US 2013/0097239 A1  Apr. 18, 2013

Related U.S. Application Data

(60) Provisional application No. 61/548,193, filed on Oct. 17, 2011.

(51) Int. Cl.
| | |
|---|---|
| G06F 15/16 | (2006.01) |
| H04N 21/41 | (2011.01) |
| G06F 17/30 | (2006.01) |
| H04L 29/08 | (2006.01) |
| H04N 21/414 | (2011.01) |
| H04L 29/06 | (2006.01) |
| H04N 21/472 | (2011.01) |

(52) U.S. Cl.
CPC ........... *H04L 67/02* (2013.01); *H04N 21/4126* (2013.01); *G06F 17/30017* (2013.01); *H04L 65/4084* (2013.01); *G06F 17/30887* (2013.01); *G06F 2216/15* (2013.01); *H04N 21/41407* (2013.01); *H04N 21/472* (2013.01)
USPC ............... 709/217; 709/203; 709/231; 725/8; 725/86

(58) Field of Classification Search
CPC .. G06F 17/30861; G06F 17/30876–17/30887; G06F 17/30873; G06F 17/30017; G06F 2216/15; H04L 29/0809; H04L 29/08099; H04L 65/403; H04L 65/4084; H04L 2012/2849; H04N 21/47–21/482; H04N 21/6125–21/613; H04N 21/4622; H04N 21/4104–21/4147; H04B 5/0025–5/0068
USPC ................ 709/201–211, 217–219, 227–231; 715/751, 753; 725/81, 86–98
See application file for complete search history.

(56) References Cited

U.S. PATENT DOCUMENTS

| | | | | |
|---|---|---|---|---|
| 6,181,689 | B1 * | 1/2001 | Choung et al. | 370/352 |
| 6,295,550 | B1 * | 9/2001 | Choung et al. | 709/204 |

(Continued)

FOREIGN PATENT DOCUMENTS

| | | |
|---|---|---|
| CA | 2659480 | 9/2010 |
| EP | 2018032 | 1/2009 |

(Continued)

OTHER PUBLICATIONS

Lowet, Dietwig, and Daniel Goergen. "Co-browsing dynamic web pages." Proceedings of the 18th international conference on World wide web. ACM, 2009.*

(Continued)

*Primary Examiner* — Patrice Winder
*Assistant Examiner* — Julian Chang
(74) *Attorney, Agent, or Firm* — Hanley, Flight & Zimmerman, LLC

(57) ABSTRACT

A content item may be identified at a first electronic device with selection for the content item to be "opened" at a second electronic device. The first electronic device may instruct that the content item be displayed or otherwise made available for further interaction at the second electronic device. A web protocol session may be established between the first electronic device and the second electronic device to allow for an instruction message from the first electronic device to the second electronic device. Upon receiving a user interface command at the first electronic device, the user interface command indicating that the content item should be displayed at the second electronic device, the instruction message is sent to the second electronic device, via the web protocol session. As a result, the content item is caused to be displayed at the second electronic device.

19 Claims, 6 Drawing Sheets

(56) References Cited

U.S. PATENT DOCUMENTS

| | | | |
|---|---|---|---|
| 6,672,775 B1* | 1/2004 | Narayanaswami | 709/219 |
| 6,687,739 B2* | 2/2004 | Anupam et al. | 709/204 |
| 6,727,923 B1* | 4/2004 | McInerney | 715/847 |
| 6,732,145 B1* | 5/2004 | Aravamudan et al. | 709/204 |
| 6,766,373 B1 | 7/2004 | Beadle et al. | |
| 6,985,742 B1 | 1/2006 | Giniger et al. | |
| 7,092,703 B1* | 8/2006 | Papineau | 455/418 |
| 7,471,947 B1* | 12/2008 | Papineau | 455/418 |
| 7,516,174 B1 | 4/2009 | Tashjian et al. | |
| 7,526,572 B2 | 4/2009 | Omar et al. | |
| 7,634,572 B2 | 12/2009 | Nanduri et al. | |
| 7,941,784 B2 | 5/2011 | Shenfield et al. | |
| 8,010,901 B1* | 8/2011 | Rogers | 715/751 |
| 8,015,496 B1* | 9/2011 | Rogers | 715/751 |
| 8,244,043 B2* | 8/2012 | Chang et al. | 382/218 |
| 2001/0009015 A1 | 7/2001 | Mousseau et al. | |
| 2002/0035603 A1* | 3/2002 | Lee et al. | 709/205 |
| 2002/0073152 A1* | 6/2002 | Andrew et al. | 709/204 |
| 2002/0083134 A1* | 6/2002 | Bauer et al. | 709/204 |
| 2002/0087479 A1 | 7/2002 | Malcolm | |
| 2002/0152464 A1* | 10/2002 | Kitsukawa et al. | 725/46 |
| 2003/0114176 A1 | 6/2003 | Phillipps | |
| 2004/0253923 A1 | 12/2004 | Braley et al. | |
| 2005/0198162 A1* | 9/2005 | Bauer et al. | 709/206 |
| 2005/0227678 A1 | 10/2005 | Agrawal et al. | |
| 2005/0286417 A1 | 12/2005 | An et al. | |
| 2007/0013967 A1 | 1/2007 | Ebaugh et al. | |
| 2007/0032225 A1* | 2/2007 | Konicek et al. | 455/417 |
| 2007/0101405 A1 | 5/2007 | Engle et al. | |
| 2007/0118895 A1 | 5/2007 | Coskun et al. | |
| 2007/0180449 A1 | 8/2007 | Croft et al. | |
| 2008/0155062 A1* | 6/2008 | Rabold et al. | 709/219 |
| 2008/0172449 A1 | 7/2008 | Bengtsson et al. | |
| 2008/0184123 A1 | 7/2008 | Shuqair et al. | |
| 2008/0248834 A1 | 10/2008 | Chatterjee et al. | |
| 2009/0061843 A1 | 3/2009 | Topaltzas | |
| 2009/0075697 A1 | 3/2009 | Wilson et al. | |
| 2009/0111378 A1 | 4/2009 | Sheynman et al. | |
| 2009/0150553 A1* | 6/2009 | Collart et al. | 709/229 |
| 2009/0164581 A1* | 6/2009 | Bove et al. | 709/205 |
| 2009/0182803 A1 | 7/2009 | Barton et al. | |
| 2009/0265438 A1* | 10/2009 | Podl | 709/206 |
| 2009/0282423 A1 | 11/2009 | Smith et al. | |
| 2009/0304346 A1* | 12/2009 | Prestenback et al. | 386/52 |
| 2010/0082746 A1* | 4/2010 | Ulrich et al. | 709/204 |
| 2010/0094996 A1 | 4/2010 | Samaha | |
| 2010/0146051 A1 | 6/2010 | Agrawal et al. | |
| 2010/0153568 A1 | 6/2010 | Uola et al. | |
| 2010/0161960 A1 | 6/2010 | Sadasivan et al. | |
| 2010/0169392 A1 | 7/2010 | Lev Ran et al. | |
| 2010/0186079 A1 | 7/2010 | Nice et al. | |
| 2010/0191624 A1 | 7/2010 | Sharir et al. | |
| 2010/0198742 A1* | 8/2010 | Chang et al. | 705/319 |
| 2010/0220849 A1 | 9/2010 | Colbert et al. | |
| 2010/0232625 A1 | 9/2010 | Konaka et al. | |
| 2010/0234051 A1 | 9/2010 | Holden et al. | |
| 2010/0234068 A1 | 9/2010 | Bolton et al. | |
| 2010/0235373 A1 | 9/2010 | Holden et al. | |
| 2010/0235425 A1 | 9/2010 | Holden et al. | |
| 2010/0235454 A1 | 9/2010 | Holden et al. | |
| 2010/0235518 A1 | 9/2010 | Holden et al. | |
| 2010/0235550 A1 | 9/2010 | Bolton et al. | |
| 2010/0235552 A1 | 9/2010 | Holden et al. | |
| 2010/0235739 A1 | 9/2010 | Rathi et al. | |
| 2010/0251084 A1* | 9/2010 | Yoshida | 715/205 |
| 2010/0274922 A1* | 10/2010 | Reavely | 709/238 |
| 2010/0275135 A1 | 10/2010 | Dunton et al. | |
| 2010/0281139 A1* | 11/2010 | Deprun | 709/219 |
| 2010/0281258 A1 | 11/2010 | Andress et al. | |
| 2010/0293598 A1* | 11/2010 | Collart et al. | 726/3 |
| 2010/0299518 A1 | 11/2010 | Viswanathan et al. | |
| 2010/0306642 A1* | 12/2010 | Lowet et al. | 715/234 |
| 2011/0010453 A1* | 1/2011 | Roy | 709/225 |
| 2011/0025816 A1 | 2/2011 | Brewer et al. | |
| 2011/0040848 A1 | 2/2011 | Xu | |
| 2011/0151922 A1 | 6/2011 | Venteicher | |
| 2011/0153728 A1* | 6/2011 | Einarsson et al. | 709/203 |
| 2011/0191677 A1* | 8/2011 | Morris | 715/716 |
| 2012/0030366 A1* | 2/2012 | Collart et al. | 709/229 |
| 2012/0042008 A1* | 2/2012 | Christianson et al. | 709/203 |
| 2012/0042078 A1* | 2/2012 | Kroeger et al. | 709/226 |
| 2012/0047449 A1* | 2/2012 | Burckart et al. | 715/753 |
| 2012/0079043 A1 | 3/2012 | Brown et al. | |
| 2012/0084516 A1* | 4/2012 | Iwuchukwu | 711/144 |
| 2012/0117145 A1* | 5/2012 | Clift et al. | 709/203 |
| 2012/0131089 A1* | 5/2012 | Berkowitz et al. | 709/203 |
| 2012/0158527 A1* | 6/2012 | Cannelongo et al. | 705/14.73 |
| 2012/0185561 A1* | 7/2012 | Klein et al. | 709/217 |
| 2012/0210242 A1* | 8/2012 | Burckart et al. | 715/744 |
| 2012/0210343 A1* | 8/2012 | McCoy et al. | 725/25 |
| 2012/0210378 A1* | 8/2012 | McCoy et al. | 725/109 |
| 2012/0220223 A1* | 8/2012 | Rose et al. | 455/41.1 |
| 2012/0221724 A1* | 8/2012 | Chor | 709/225 |
| 2012/0227076 A1* | 9/2012 | McCoy et al. | 725/110 |
| 2012/0238250 A1* | 9/2012 | Iwuchukwu | 455/414.1 |
| 2012/0246480 A1* | 9/2012 | Selander et al. | 713/168 |
| 2012/0272148 A1* | 10/2012 | Strober | 715/716 |
| 2012/0304204 A1* | 11/2012 | Nishimura et al. | 725/1 |
| 2012/0304239 A1* | 11/2012 | Shahraray et al. | 725/115 |
| 2012/0306993 A1* | 12/2012 | Sellers-Blais | 348/14.08 |
| 2012/0317487 A1* | 12/2012 | Lieb et al. | 715/730 |
| 2012/0324024 A1* | 12/2012 | Benassaya et al. | 709/206 |
| 2012/0324094 A1* | 12/2012 | Wyatt et al. | 709/224 |
| 2013/0016955 A1* | 1/2013 | Pejaver | 386/248 |
| 2013/0018960 A1* | 1/2013 | Knysz et al. | 709/204 |
| 2013/0024901 A1* | 1/2013 | Sharif-Ahmadi et al. | 725/114 |
| 2013/0055323 A1* | 2/2013 | Venkitaraman et al. | 725/82 |
| 2013/0069769 A1* | 3/2013 | Pennington et al. | 340/12.28 |
| 2013/0086228 A1* | 4/2013 | Goldman | 709/219 |
| 2013/0219065 A1* | 8/2013 | Chor | 709/225 |
| 2014/0020010 A1* | 1/2014 | Fan et al. | 725/25 |

FOREIGN PATENT DOCUMENTS

| | | |
|---|---|---|
| WO | 2005117392 | 12/2005 |
| WO | 2007084436 | 7/2007 |
| WO | 2008042474 | 4/2008 |
| WO | 2009102527 | 8/2009 |
| WO | 2010042733 | 4/2010 |
| WO | 2010053999 | 5/2010 |
| WO | 2010129516 | 11/2010 |

OTHER PUBLICATIONS

Atterer, Richard, Albrecht Schmidt, and Monika Wnuk. "A proxy-based infrastructure for web application sharing and remote collaboration on web pages." Human-Computer Interaction—INTERACT 2007. Springer Berlin Heidelberg, 2007. 74-87.*

Peng, Gaoyi, Jianhua Sun, and Hao Chen. "SRCS: Multi-user Web Browser Sharing and Collaboration System." Parallel and Distributed Computing, Applications and Technologies (PDCAT), 2010 International Conference on. IEEE, 2010.*

Thum, Christian, and Michael Schwind. "Synchronite—A Service for Real-Time Lightweight Collaboration." P2P, Parallel, Grid, Cloud and Internet Computing (3PGCIC), 2010 International Conference on. IEEE, 2010.*

Thum, Christian, Michael Schwind, and Martin Schader. "SLIM—A lightweight environment for synchronous collaborative modeling." Model Driven Engineering Languages and Systems. Springer Berlin Heidelberg, 2009. 137-151.*

Wiltse, Heather, and Jeffrey Nichols. "PlayByPlay: collaborative web browsing for desktop and mobile devices." Proceedings of the SIGCHI Conference on Human Factors in Computing Systems. ACM, 2009.*

Patent Cooperation Treaty, "International Search Report", issued in connection with PCT Application No. PCT/CA2012/050304, issued Jul. 26, 2012, (4 pages).

Patent Cooperation Treaty, "Written Opinion of the International Searching Authority", issued in connection with PCT Application No. PCT/CA2012/050304, issued Jul. 26, 2012, (4 pages).

European Patent Office, "Extended European Search Report", issued in connection with EP Application No. 12168053.2, dated Aug. 9, 2012, (7 pages).

(56) References Cited

OTHER PUBLICATIONS

Burns, Chris, "webOS Touch to Share URLs, Calls, and More Between Pre3 and TouchPad"; http://www.slashgear.com/webos-touch-to-share-urls-calls-and-more-between-pre3-and-touchpad; Oct. 16, 2011.
Roth, Gregor, "HTML5 Server-Push Technologies, Part 2"; http://today.java.net/article/2010/04/26/htm15-server-push-technologies-part-2; Mar. 31, 2010.
Roth, Gregor, "HTML5 Server-Push Technologies, Part 1"; http://today.java.net/article/2010104/26/htm15-server-push-technologies-part-1; Mar. 31, 2010.
Cable, Laurence, "How to use your iPad as a secondary screen for your Mac", http://www.techradar.com/news/mobile-computing/tablets/how-to-use-your-ipad-as-a-secondary-screen-for-your-mac-961494?src=rss; Jun. 5, 2011.
Harvell, Ben and Cable, Laurence; "The complete guide to AirPlay; tutorial: How to stream movies and music all around your house"; http://www.techradar.com/news/computing/apple/the-complete-guide-to-airplay-947819; May 1, 2011.
Miller, Paul, "HP touchstone Touch-to-share lets devices swap URLs, 'Exhibition' mode added for phones", http://www.engadget.com/2011/02/09/hp-touchstone-tech-now-lets-you-tap-two-devices-together-to-swap/. Feb. 9, 2011.
International Bureau, "International Preliminary Report on Patentability," issued in connection with application No. PCT/CA2012/050304, mailed on May 1, 2014, 6 pages.
I-Jetty, Welcome! Welcome to the i-jetty console!, retrieved from the Internet on Apr. 6, 2011, 1 page.
Wikipedia, AJax (programming), http://en.wikipedia.org/wiki/Ajax_(programming), last modified on Jul. 29, 2011, 5 pages.
Wikipedia, Comet (programming), http://en.wikipedia.org/wiki/Comet_(programming), last modified on Jul. 4, 2011, 6 pages.
Feedfury, Android Colosseum, Interview: WebTide Developers speaks i-jetty and Google Android, Apr. 4, 2008, 4 pages.
Into Mobile, Run a web-server on your Android mobile phone with iJetty, Internet posting dated Mar. 17, 2008, 11 pages.
Nokia Betalabs, Moblie Web Server, retrieved from the Internet Apr. 4, 2011, 2 pages.
Cute Android, Open Source Android Apps for Developers: I-Jetty (webserver for the android mobile platform), retrieved from www.cuteandroid.com, retrieved from the internet on Apr. 6, 2011, 9 pages.
I-Jetty, I-Jetty: webserver for the android mobile platform, downloads page, powered by Google Project Hosting, retrieved from the internet on Apr. 6, 2011, 1 page.
I-Jetty, I-Jetty: webserver for the android mobile platform, Creating Downloadable WebApps, powered by Google Project Hosting, retrieved from the internet on Apr. 6, 2011, 7 pages.
Phonemag, i-Jetty turns Android cellphone into mobile webserver, www.phonemag.com, posted Mar. 17, 2008, 6 pages.
Ajax Push Engine, What is Ape, http://www.ape-project.org/about.html, retrieved from the internet on Aug. 2, 2011, 2 pages.
Sofotex, Idokorro Mobile Desktop, http://www.sofotex.com/Idokorro-Mobile-Desktop-download_L38662.html, retrieved from the internet on Aug. 2, 2011, 5 pages.
Super Shareware, TS Mobiles 2.1.4, http://www.supershareware.com/info/tsmobiles.html, retrieved from the Internet on Aug. 5, 2011, 3 pages.
Wikipedia, Apache HTTP Server, http://en.wikipedia.org/wiki/Apache_web_server, retrieved from the internet on Aug. 5, 2011, 4 pages.
Wikiwebserver, What is WikiWebServer?, http://www.wikiwebserver.org/, retrieved from the internet on Aug. 5, 2011, 2 pages.
Nokia, Mobile Web Server: How to Develop Content, Version 1.0; May 29, 2007, 23 pages.
June Fabrics Technology Inc., PDANET for Android FAQs, internet article, Copyright 2003-2010, 2 pages.
Todd Rosenberry, Sans Institute, Protecting Your Corporate Network from Your Employee's Home Systems, GIAC Security Essentials Certification, Version 1.4b, Option 1, Dec. 21, 2003, 24 pages.
Stack Overflow, Comet for User based Notification over a Message Queue questions, asked Jun. 24, 2010, 1 pages.
Russell et al., The Bayeux Specification, Bayeux Protocol—Bayeux 1.0.0, http://svn.cometd.com/trunk/bayeux/bayeux.html, 2007, 25 pages.
Seopher, Multiple Ajax responses with 1 request (mootools and PHP), internet article, posted on Dec. 22, 2007 at 12:10 in Tutorials, 9 pages.
Member Wiki, Simple Protocol for Ajax Push, www.openajax.org, page last modified on Jun. 20, 2007, 3 pages.
You have got Hypertext, Schraefel, Journal of Digital Information, vol. 5, No. 1, 2004, 17 pages.
Patent Cooperation Treaty, "International Search Report," issued in connection with International Patent Application No. PCT/CA2011/050574, on Nov. 17, 2011, 3 pages.
Patent Cooperation Treaty, "Written Opinion," issued in connection with International Patent Application No. PCT/CA2011/050574, on Nov. 17, 2011, 8 pages.
Patent Cooperation Treaty, "International Preliminary Report on Patentability," issued in connection with International Patent Application No. PCT/CA2011/050574, on Apr. 2, 2013, 9 pages.
European Patent Office, "Extended European Search Report," issued in connection with European Patent Application No. 11827869.6, on May 28, 2013, 7 pages.
European Patent Office, "Exam Report," issued in connection with European Patent Application No. 121680532, on Nov. 29, 2013, 4 pages.
United States Patent and Trademark Office, "Non-Final Office Action," issued in connection with U.S. Appl. No. 13/195,587, on Apr. 5, 2013, 21 pages.
European Patent Office, "Intent to Grant," issued in connection with European Patent Application No. 12168053.2, on Apr. 10, 2014, 7 pages.

\* cited by examiner

METHOD AND ELECTRONIC DEVICE FOR CONTENT SHARING

CROSS-REFERENCE TO RELATED APPLICATIONS

This disclosure claims the priority of U.S. Provisional Application No. 61/548,193, filed Oct. 17, 2011, the content of which is incorporated in its entirety herein.

FIELD OF TECHNOLOGY

The present disclosure relates generally to a first electronic device capable of promoting content interaction at a second electronic device; more specifically, a portable electronic device may use a web protocol session to enable content interaction at a different electronic device.

BACKGROUND

Portable electronic devices (e.g. phones, laptops, tablet, etc) have become more sophisticated. Today, a user may retrieve, view, edit, or otherwise interact with content at a portable electronic device. However, there are some forms of content that may be difficult to view on a display screen of a portable electronic device. For example, if a portable electronic device has a small display, the content may be reduced in size, truncated, or redacted to fit in the area available on the display screen. If the display area available on a portable electronic device is too small to effectively display the content, a user may desire to view the content on a different device that has a larger display area, such as a tablet, laptop, television, kiosk screen, and the like.

A user might email to himself a link (e.g. Uniform Resource Locator, URL) to the content and then open the email on the different device. Alternatively, a user may save the content on the portable electronic device, connect the portable electronic device to a computer via a USB (Universal Serial Bus) cable, and then operate the computer to retrieve the content from the portable electronic device. Even for a sophisticated user, these approaches may be cumbersome and unnecessarily time consuming. Some portable electronic devices are equipped with video-out ports, such as VGA (Video Graphics Array), HDMI (High-Definition Multimedia Interface), or other known video output interfaces. The portable electronic device may use these video output interfaces to generate a video output at the portable electronic device for display to a connected display or television.

In one approach, a computer may generate a video output using a graphics controller at the computer and then transmit the generated video output via a network protocol to another machine that simply displays the generated video output. These types of technologies have been referred to as a "remote desktop," or "virtual desktop." For example, a host computer may run a host application which communicates with a corresponding client application at a client machine. Typically, the communications connection between host application and client application is based upon a proprietary protocol and may use a non-standard TCP port address at the host computer network interface. The host computer utilizes a graphics processor at the host computer to generate visual output data that is sent to the client machine. A person of skill in the art would recognize this category of prior art by well-known monikers, such as Windows™ Remote Assistance, Citrix™ GoToMyPC™, and the like. The "remote desktop" approach requires graphics processing resources at the host computer to generate the video output, even though a user is "interacting" with the content at the machine that displays the video output. In addition to utilizing resources at the host computer, this may cause latency or user interface lag for a user interacting with the content at the client machine.

In very recent developments, some companies have promoted a proprietary approach that includes specialized software at a first device and at a second device for allowing the one device to control the other. For example, if you have a "Company-A" computer and a "Company-A" mobile phone, the computer and the mobile phone may be equipped with proprietary protocols for sending files between the two machines. A problem with this approach is that the protocols may be specific to transferring files, rather than addressing a need to interact with files at one or both machines. Furthermore, endpoints of the proprietary protocol may be so tightly embedded in the operating system that they become cumbersome to upgrade or maintain among the plurality of devices that a typical user may wish to use as technology develops. This technology may be referred to as "remote control" approach. Upon selection at a client machine, a command is sent by a client application to a corresponding host application to playback a selected media file using a media player at the host computer. In this approach, the client machine operates as a remote control to remotely operate the media player at the host computer. The "remote control" approach requires that the client application be programmatically linked to the commands associated with the media player. Furthermore, the remote control applications make assumptions about the types and locations of the media content. These approaches tend to be single-purpose applications with limited ability to transfer direct control over a content item from one machine to another machine.

Near Field Communication (NFC) has been used in some approaches, to coordinate data between two devices. NFC may be used to playback media content from a master device to one of a plurality of slave devices, and may also be used for a "bumping" approach in which short range radio technology is used to transfer information between two portable electronic devices. For example, a first electronic device may have a NFC transceiver. When the first electronic device is brought into close proximity to a second electronic device, the NFC transceiver is capable of transmitting short range radio frequency transmissions to a NFC transceiver at the second electronic device. The process of bringing the electronic devices close enough for the NFC transmissions may be referred to as "bumping," "tapping," or "touching." In one approach, when the first electronic device is bumped with the second electronic device, a URL of a web page may be transmitted via the NFC transmission to the second electronic device. The second electronic device may then display the web page using a browser at the second electronic device. The bumping approach has distance and bandwidth limitations associated with short-range radio frequency. Furthermore, if the content is stored at the first electronic device, then the second electronic device may need to be kept in very close proximity to the first electronic device in order to properly transfer the content. Depending on the technology used for short-range radio frequency communication (such as NFC), the bandwidth between the devices may be limited.

BRIEF DESCRIPTION OF THE DRAWINGS

Embodiments of the present disclosure will now be described, by way of example only, with reference to the attached Figures in which like reference numerals are used to indicate similar features.

DETAILED DESCRIPTION

Figure 1:
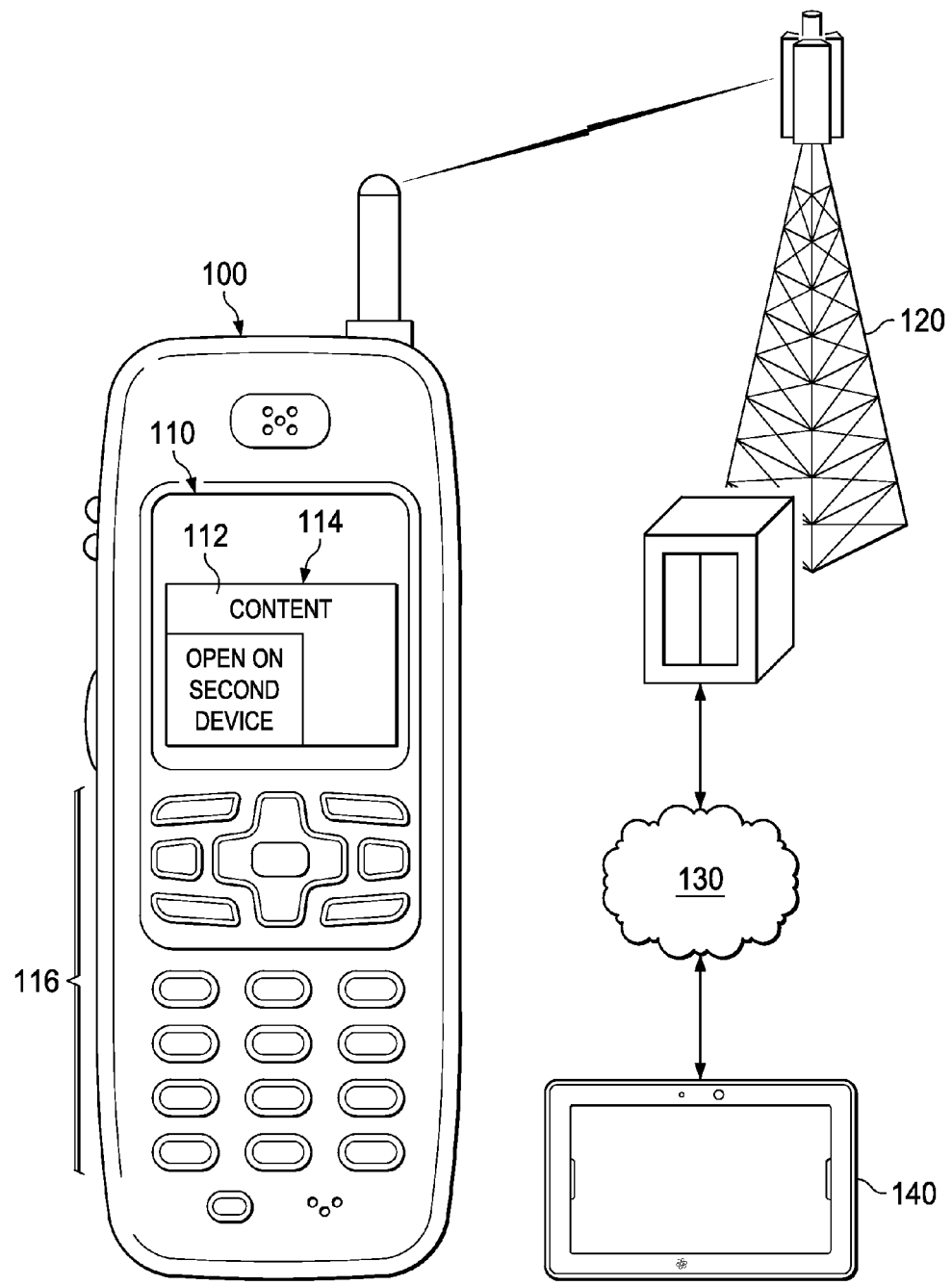
FIG. 1 is a diagram of a system illustrating a narrative example in accordance with an embodiment of the present disclosure.

The present disclosure describes an approach that allows a first electronic device to cause a content item (e.g. email, media file, document, etc) to be "opened" (e.g. displayed, viewed, or edited) at a second electronic device. At the first electronic device a user selection (also referred to herein as a "user interface command") is received. The user selection is associated with displaying a content item at the second electronic device. An instruction message (also referred to herein as "instruction") is sent to the second electronic device to cause the content item to be displayed at the second electronic device. The instruction message may be sent from the first electronic device to the second electronic device via a web protocol session (also sometimes referred to as a "web protocol connection") between the two devices.

In one embodiment, a web protocol session is established between a first electronic device and a second electronic device. In this disclosure, a web protocol session may be used in a non-traditional manner to provide a peer-to-peer relationship between a first electronic device and a second electronic device. The web protocol may be hypertext transfer protocol (HTTP) or other protocols traditionally used for exchanging content between two endpoints. The first electronic device (also referred to herein as a host electronic device) may operate a web server. The second electronic device (also referred to herein as a client electronic device) may operate a web client. A web protocol session may be a communication connection established using a web protocol. It should be understood that the web protocol session may be a web-protocol-based communication connection established over a private network, direct connection, or wireless connection, and does not necessarily refer to a web-based network path (e.g. "Internet" or any public networks).

In this disclosure, "host" and "client" designations are used simply to refer to the endpoints of the web protocol session between the two devices—and may be interchangeable in some embodiments. For simplicity in this disclosure, host and client endpoints are described in terms of the web server (at a first electronic device) and the web client (at a second electronic device), respectively. A host (web server) represents the implementation of a web protocol endpoint that listens for requests from a client and responds to the requests. Similarly, a client (web client) represents the implementation of a web protocol endpoint that sends requests to the web server and then processes the response message. The web client traditionally is associated with a web browser and displayed via a user interface. However, it should be well understood that a web client may comprise a background process that performs the functionality of a web client without displaying a traditional web browser.

It should be understood that the examples described herein are simply examples and that further applications of the disclosed technology will be readily understood to persons of skill in the art. In a narrative example, a user may be reading through several emails via a messaging application at a smart phone device. One email has an attachment which includes a substantial amount of text and graphics. Due to the available screen size of the smart phone device, the user would prefer to open the attachment using a tablet device that has a larger screen. Using at least one embodiment described in this disclosure, the user of the smart phone device selects a user interface command at the smart phone device that may be labeled "Open attachment on tablet." Upon selecting the user interface command, a user interface window is opened on the tablet and the attachment is displayed in the window. In some embodiments the user may be able to edit or otherwise interact with the attachment at the tablet.

FIG. 1 is a diagram of a system used to illustrate a narrative example of an embodiment in accordance with the present disclosure. A first electronic device 100 and a second electronic device 140 are shown in FIG. 1. Although the first electronic device 100 is depicted as a mobile communications device and the second electronic device 140 is depicted as a tablet computing device, it should be understood that these depictions are representations and that the first and second electronic devices may be other types of computing devices, such as a portable gaming system, feature phone, smart phone, laptop, desktop, internet kiosk, or even network-connected appliances such as televisions, refrigerators, tabletops, etc.

The first electronic device 100 may include a display 110, and/or user interface controls 116 such as keyboard, touch screen capability, trackpad, etc. The first electronic device 100 may be capable of displaying content 112 on the display 100. In addition, the first electronic device 110 may provide a user interface control 114 for receiving a user interface command to display the content 112 on the second electronic device. The second electronic device 140 may be communicating with the first electronic device 100 using a web protocol session over one or more networking paths, such as a wireless communications system 120 and generic network path 130. For example, the network path may include a direct radio frequency connection, Bluetooth™, infrared, wireless LAN, wireless communications network, wired connection (such as Ethernet, USB, etc), or the like. In FIG. 1, a wireless communications system 120 and generic network path 130 are depicted for brevity.

The first electronic device 100 and the second electronic device 140 maintain a web protocol session (not shown) between them in which the first electronic device 100 operates a web server application and the second electronic device 140 operates a web client application. The web server application and web client application interact with each other in accordance with the present disclosure such that the web server application can send an instruction (e.g. instruction message) to the web client application responsive to detecting the user interface command associated with the user interface control 114. The instruction message from the web server application may be considered a "notification," "push notification," "event notification," "instruction," "command message" or other terms used to indicate that the instruction message is sent as a result of a process at the first electronic device 100. The instruction message sent to the second electronic device 140 contains information which can be interpreted by the second electronic device 140 to cause the associated content (associated with content 112) to be displayed or otherwise presented at the second electronic device 140.

The first electronic device 100 is capable of instructing the second electronic device 140 to "open" the content for display at the second electronic device 140, effectively over both short or long distance ranges—as long as there is a network path supporting a web protocol session between the first electronic device and the second electronic. In one embodiment, a commonly known web protocol may be used to maintain a pending web connection, which enables a push-type behavior from a host electronic device to a client electronic device and increases the speed with which a content item appears to be opened at the client electronic device.

Figure 2:
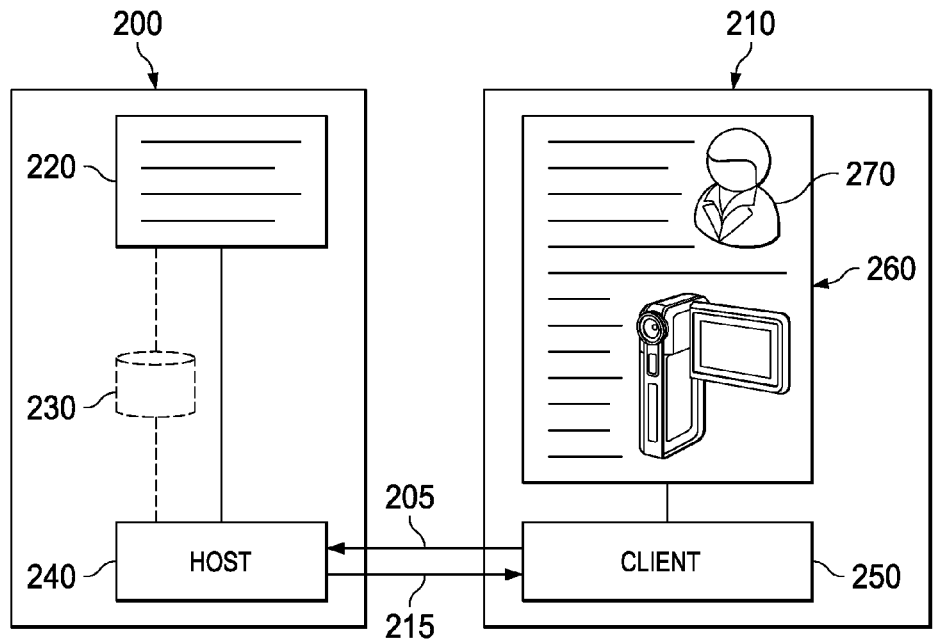
FIG. 2 is a block diagram illustrating a content item opened on a client electronic device in accordance with an embodiment of the present disclosure.

FIG. 2 illustrates an example of an embodiment in accordance with the present disclosure. A first electronic device 200 is running a web host application 240. The web host application 240 is capable of communicating using known web protocols, such as hypertext transfer protocol (HTTP). The first electronic device 200 also has a user interface that includes a display 220. The display 220 may present content that is locally stored at the first electronic device, at optional storage 230. Alternatively, the display 220 may be used to present content obtained from a resource external from the first electronic device 200.

A second electronic device 210 is running a web client application 250, which is also capable of communicating using known web protocols. The second electronic device 210 also has a user interface that includes a display 260. It should be understood that both the first electronic device 200 and the second electronic device 210 may include other processors, memory, operating systems, or components not depicted in this figure, and omitted in the interest of brevity. The electronic devices may include components such as those described in apparatus 700 in FIG. 7, or other suitable components.

The web client application 250 establishes a web protocol session with the web host application 240, or vice versa. In an embodiment, the first electronic device 200 and second electronic device 210 may exchange security keys or other connection configuration information necessary to establish a trust relationship prior to establishing the web protocol session. The security configuration and connection configuration is beyond the scope of the present disclosure and are well known to persons of skill in the art. For example, the security configuration may include the exchange of SSL keys, establishing TCP/IP network connections, or other network paths between the first and second electronic devices. In some implementations the network path (not shown) between the first electronic device 200 and the second electronic device 210 may include one or more of a Bluetooth™ connection, an NFC connection, a wireless LAN (such as IEEE 802.11), a mobile communications wireless network connection, a wired connection (such as Ethernet), a public Internet, or any similar technologies capable of supporting a TCP/IP network connection.

In this embodiment a web protocol session is established such that the web protocol session can simulate a server-push-type functionality (also referred to as "push-capability") for sending notifications from the first electronic device 200 (e.g. web server) to the second electronic device 210 (e.g. web client). The push-capability allows the web server at the first electronic device 200 can initiate a web protocol message to the second electronic device 210 upon detecting a triggering condition at the web server. It should be understood that "push-capability" may be simulated using a poll-response mechanism rather than a server-initiated push message. For example, the server push-capability may be simulated over an HTTP connection when the web client sends a HTTP GET request message, referred to as an "open GET" or a "long-polling" request message. The open GET is a one of several techniques that may be associated with a semi-persistent or long-lasting HTTP connection between a web server and a web client. In an example implementation, the push-capability is simulated over the web protocol session using Comet long-polling.

Comet is an umbrella term that encompasses many of these techniques. In some documents, Comet may be referred to as Ajax Push, Reverse Ajax, Two-Way-Web, HTTP streaming, HTTP server push, or other terms. A common feature of these techniques is that an HTTP session is established and maintained so that a web server may simulate a "push" message to a web client at some time after the HTTP session is established. For example, HTTP streaming is used when the web server and web client open a persistent connection, over which the web server incrementally sends additional data to the web client as needed. Long polling is another unidirectional method, in which a web client sends an "open GET" to the web server, and the web server does not respond to the open GET until there is data that the web server will "push" to the web client. The response message from the web server is responsive to the open GET, but occurs after there is a trigger at the web server to send the response message.

It should be understood that Comet is not a separate web protocol—it is a way of using existing the HTTP protocol to simulate a web server push capability. The HTTP protocol is not designed to send unrequested responses from the web server to the web client. A HTTP response always requires a previous HTTP request initiated by the web client. The Comet approach breaks this limitation by maintaining long-lived HTTP connections that can be used by the web server to send notifications as a HTTP response to a previously sent HTTP request message. With long-polling, the web client sends a HTTP request, waiting for a server event. If an event occurs on the server-side, the server sends the response including the event data. After receiving the response containing the event data, the web client may send a further HTTP request, waiting for the next event. There is always a pending HTTP request which allows the web server to send a response at any time.

Similar to long-polling, HTTP Streaming may be used to simulate a server push. With HTTP streaming, the web server keeps the response message open. The HTTP response message (body) will not be closed after sending an event to the web client. If an event occurs on the server-side, the server will write this event to the open response message body. The HTTP response message body represents a unidirectional event stream to the web client.

Other web protocols may be used to simulate a push capability at the web server. For example, HTML 5 defines a standardized communication pattern called Server-Sent Events (SSE) which automates the Comet approach. The Server-Sent Events specification defines an API for opening an HTTP connection for receiving push notifications from a server. A web connection is established in which the web client opens an event stream with the web server. The web server keeps the response open so that event data is written to the event stream as they occur on the web server side. Server-Sent Events will be supported natively by all HTML5-compatible browsers.

Other protocols, such as Bayeux or BOSH may implement some of the Comet-like solutions, including long-polling. The Bayeux protocol supports a bidirectional communication channel. Furthermore, Bayeux can use HTTP streaming as well as long polling. Like Bayeux, the BOSH protocol is a bidirectional protocol. BOSH is based on the long polling approach.

The HTML5 standard also defines a protocol called Web-Sockets. WebSockets enables establishing a bidirectional communication channel directly over TCP/IP. The WebSocket protocol defines a HTTP handshake behavior between a web client and a web server. Once the HTTP handshake is completed, the web server and web client switch an existing HTTP connection to a lower level WebSocket connection. Therefore, while data transmitted using the WebSocket protocol is not built on top of HTTP, it relies on the HTTP protocol to establish the WebSocket connection. WebSockets does not try to simulate a server push channel over HTTP. Instead, WebSockets defines a framing protocol for two-way communication natively over the TCP/IP connection.

SPDY (short for SPeeDY) replaces some parts of HTTP, but mostly augments it with features to reduce latency. At the highest level of the application layer, the request-response protocol remains the same in SPDY as HTTP. SPDY uses previous HTTP methods, headers, and other semantics. The usual HTTP GET and POST message formats remain the same; however, SPDY specifies a new framing format for encoding and transmitting the data over the wire.

As described herein, HTTP, WebSockets, and SPDY are all considered web protocols. Other protocols may be apparent to persons of skill in the art, including experimental or later developed protocols that are associated with transferring content from a web server to a web client. A web protocol session may be used to simulate or natively create a server push-capability from the web server to the web client. Examples of technologies used to provide server push-capability include (but not limited to) COMET long-polling, HTTP Streaming, Bayeux Protocol, BOSH, HTML 5 Server-Sent Events (SSE), and WebSockets, or other similar technologies which may or may not be described in Internet Engineering Task Force (IETF) documents.

Returning to FIG. 2, either during or after a web protocol session is established, the web client application 250 sends a request message 205 (e.g. a "long-polling" HTTP GET message) to the web host application 240. The web host application 240 may not respond to the request message 205 until a trigger at the web host application 240 triggers a response. In this example embodiment, the request message 205 is maintained as an open request. At some time after the request message 205 has been received, a user interface command (not shown) is selected at the first electronic device 200. For example, a content item may be displayed on display 220 with an icon, menu option, or other element which is associated with the user interface command. The user interface command is selected in relation to a content item and associated with displaying the content item at the second electronic device.

In one example, the user interface command is a plain language menu option. For example, the user interface command may refer to "open on second electronic device." Other terms may be readily conceived, such as "open on," "display on," "edit on," or other types of command. The user interface command may be associated with opening, displaying, presenting, projecting, editing, or viewing the content item at the second electronic device.

Responsive to receiving the user interface command, the first electronic device 200 triggers a web protocol response 215 from the web host application 240 to the web client application 250. In one implementation, the response 215 includes a Uniform Resource Identifier (URI) of the content item. The URI is provided to the web client application 250 so that the web client application 250 may fetch the content item from a location specified in the URI. In another implementation, the response 215 may include the content item as part of the response 215. The response message 215 may be an eXtensible Markup Language (XML) formatted message, an HTML formatted message, or other web content format which is compatible with the web protocol session.

If the response message 215 includes a URI, the web client application 250 may process the response message 215 in different ways. For example, the URI may be a relative path to the content item or a full path to the content item. If the URI has a relative path, then the content item may be located in various places—such as at a storage 230 at the first electronic device 200, a storage (not shown) at the second electronic device 210, or another machine (not shown) accessible via a network connection at the second electronic device 210.

Another aspect of the present disclosure is to display a content item at the second electronic device 210 for an improved presentation. For example, the content item may be displayed at display 220 having less content features, such as images or portions removed, summarized content, or compression of content features. In an embodiment, when the content item is displayed at display 260 on the second electronic device 210, the displayed content item 270 may include more content features or improved resolution than when the same content item was displayed at display 220.

Figure 3:
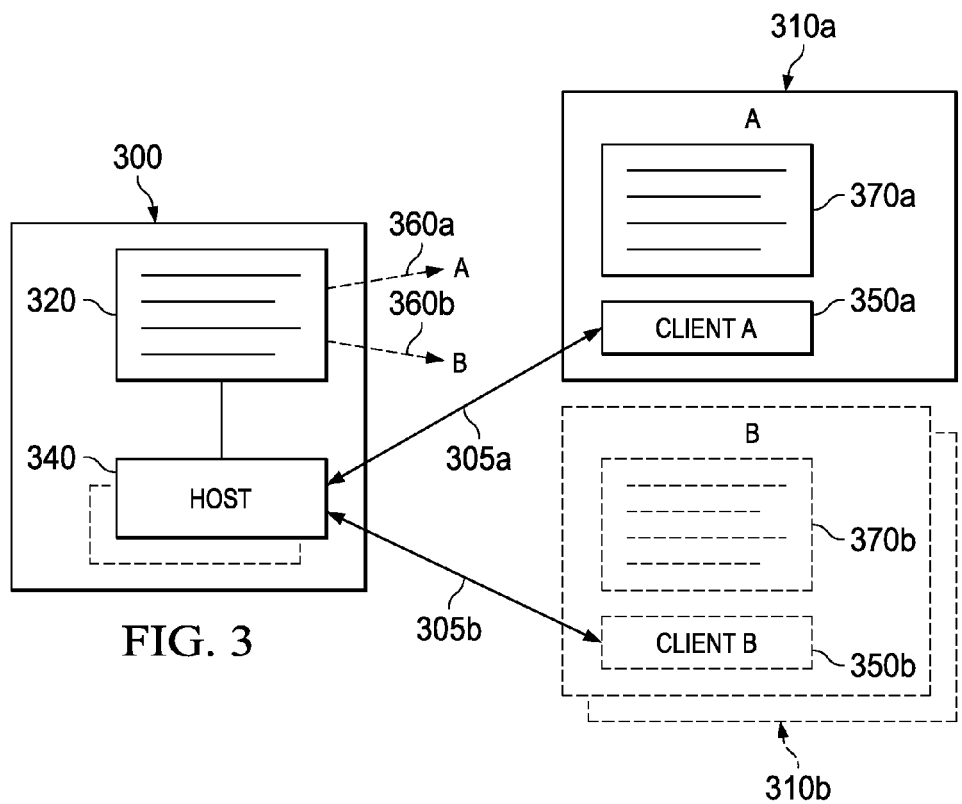
FIG. 3 is a block diagram illustrating a host electronic device operable to open a content item at one of a plurality of client electronic devices in accordance with an embodiment of the present disclosure.

FIG. 3 is a diagram illustrating further scenarios in accordance with the present disclosure. In FIG. 3, a first electronic device 300 is operating a web host application 340. The web host application 340 is responsive to user input commands received via a user interface, such as a menu system displayed via display 320. In one example, there are more than one web client applications, represented by web client application 350a and web client application 350b, that have established a web protocol session with the web host application 340. Web client application 350a is embodied at electronic device A 310a, and web client application 350b is embodied at electronic device B 310b. It should be apparent that any plurality of electronic devices may be used in this example, and for the sake of simplicity only two devices are described in FIG. 3. Furthermore, FIG. 3 is described with a single web host application 340 at the first electronic device 300; however in an implementation there may be different instances of web host applications that are logically associated with each web client application.

Web client application 350a may establish a web protocol session 305a with the web host application 340. Similarly, web client application 350b may establish a web protocol session 305b with the web host application 340. The web protocol sessions 305a, 305b may include the use of a long-polling request, such as the Comet technology described in relation to FIG. 2. Another way of describing the web protocol sessions 305a, 305b is the use of a HTTP GET request from the web client applications 350a, 350b to indicate to the web host application 340 that the web client applications 350a, 350b, respectively are available to receive a push notification from the web host application 340. The web protocol sessions 305a, 305b may not necessarily indicate that the respective web client application is available to receive an "open content item" instruction from the web host application 340. However, in one embodiment, the open HTTP GET request includes an indication that the web client application supports the "open content item" instruction from the web host application. The "open content item" instruction is used herein only as a shorthand for representing a message (from the web server application to the web client application) for opening, displaying, presenting, editing, or otherwise allowing for interaction with the content item via a user interface at the electronic device that receives the "open content item" instruction.

On the first electronic device 300, a menu system may provide a plurality of user interface controls via display 320. For example, there may be a user interface command A 360a that is associated with opening the content item on the electronic device A 310a. Another user interface command B 360b may be associated with opening the content item on the electronic device B 310b. In this way, a user of the first electronic device 300 may control the display of the content item on either of the electronic devices 310a, 310b.

An example of the usefulness of this technology may be a consumer example. A user of a first electronic device 300 (e.g. a mobile communications device) may also have a second electronic device 310a (e.g. a tablet computer or desktop computer) as well as a third electronic device 310b (e.g. an Internet-connected television or table-top surface). As the user of the first electronic device 300 encounters content items, the user may optionally control via user interface commands 360a, 360b, which connected device should be used to display the content item. In a further example, there may be multiple client electronic devices that establish web protocol sessions with a web server. The web server may initiate the display of the content item (e.g. simultaneously, selectively, or sequentially) at the multiple client electronic devices in accordance with this disclosure.

Figure 4:
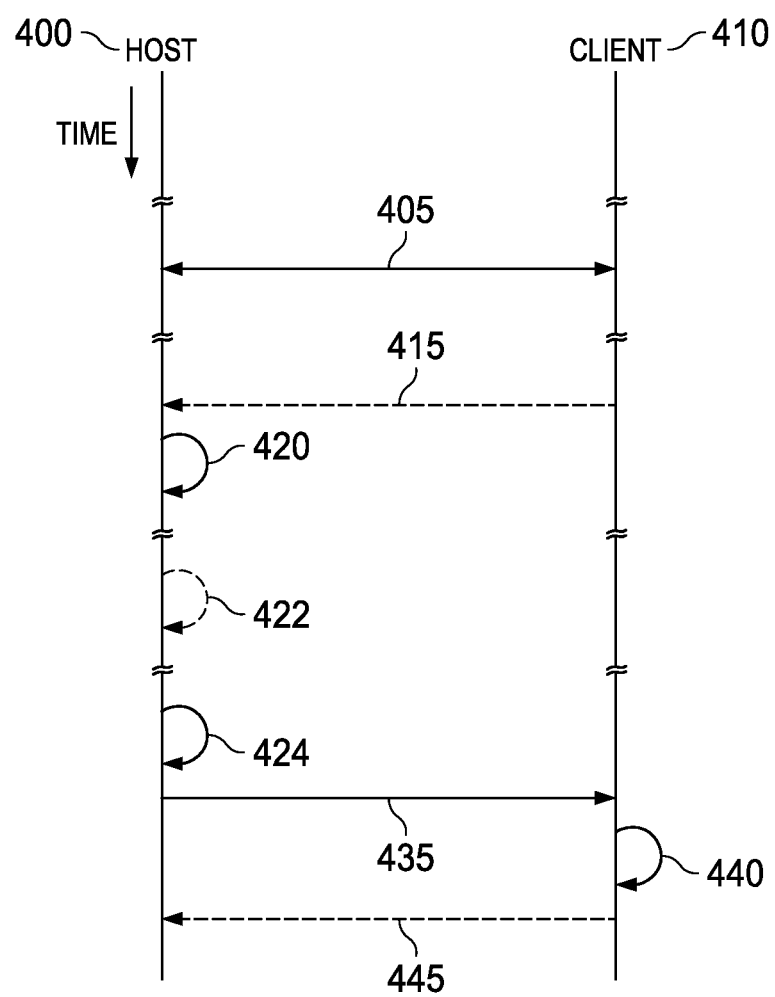
FIG. 4 is a diagram illustrating an example message flow in accordance with an embodiment in the disclosure.

FIG. 4 is a diagram illustrating an example message flow in accordance with an embodiment in the disclosure. A first electronic device 400, shown as a host device, is operating a web host application. A second electronic device 410, shown as a client device, is operating a web client application. At 405 a web protocol session is established between the first electronic device 400 and the second electronic device 410. The web protocol session may used to establish a server-push-type functionality (also referred to as "push-capability") so that the web server at the first electronic device 400 can initiate a web protocol message to the second electronic device 410 upon detecting a triggering condition. In this embodiment, the triggering condition is the user interface command to send a "open content item" instruction to the second electronic device. At 415, the second electronic device 410 may send a long-polling open HTTP GET request message to the first electronic device 400, so that the first electronic device 400 has a pending GET message available to use for a response message upon detecting the triggering condition.

At 420, the first electronic device 400 maintains the web protocol session, including the pending open GET request. For example, the first electronic device 400 may withhold a response to the pending open GET request. Alternatively, the first electronic device 400 may transmit keep-alive messages, or http streaming messages, as needed to maintain a push-capability over the web protocol session. At 422, the first electronic device 400 may display a content item or a portion thereof. Alternatively, a listing or menu system may be provided to allow an identification or a selection of a content item via a user interface of the first electronic device 400.

At 424, the first electronic device 400 receives a user interface command associated with opening a content item for display at the second electronic device 410. The process associated with 424 will trigger an "open content item" instruction message to be sent at 435 to the second electronic device. As described previously, the "open content item" instruction message does not necessarily have to be formatted in a specific message type. For example, the "open content item" instruction message may be a simple HTTP RESPONSE message to the second electronic device and may include a URI to the content item or alternatively may include the content associated with the content item in the HTTP RESPONSE. In one example embodiment, the "open content item" instruction message may include an explicit instruction to the second electronic device to cause the content item to be opened. For example, the "open content item" instruction message may identify the type of content and/or an application that should be used to display the content item.

At 440, the second electronic device processes the "open content item" instruction message from the first electronic device. As a result of processing the instruction message, the content item will be opened for display by the second electronic device. It should be understood that "display by" the second electronic device includes the use of any variety of display means, such as connected monitors, speakers, projectors, touch-screens, and the like.

At 445, the second electronic device 410 may optionally send another HTTP GET request message to the first electronic device 400 so that there is a pending open GET available to the first electronic device for use in a subsequent push notification or instruction from the first electronic device 400.

Figure 5:
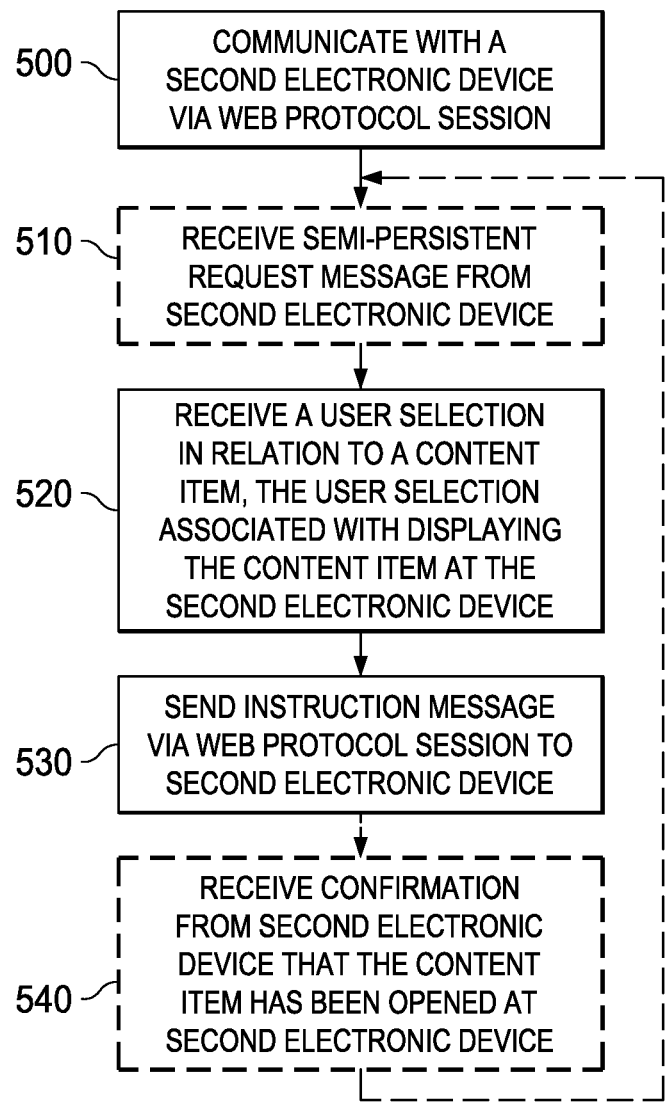
FIG. 5 is a flowchart illustrating a method performed by a host electronic device in accordance with an embodiment in the disclosure.

FIG. 5 is a flowchart diagram illustrating an example process in a first electronic device in accordance with an embodiment of the present disclosure. The first electronic device may operate a web server application, and function similar to the descriptions for first electronic devices 100, 200, 300, 400. At block 500, a web protocol session is established between the first electronic device and a second electronic device. The web protocol session may include the use of an open GET request from the second electronic device, an open RESPSONSE to the second electronic device, a WebSockets connection, or other mechanisms used to enable a web server operating on the first electronic device to initiate a communication (e.g. "push notification") to the second electronic device. Optional block 510 illustrates an example web protocol session in which a semi-persistent request message is received from the second electronic device—similar to the Comet long-polling GET request described in FIG. 2.

At block 520, the first electronic device receives a user interface command in relation to a content item, the user interface command associated with causing the display of the content item at the second electronic device. At block 530, the first electronic device sends a message via the web protocol session to the second electronic device. For example, the message may be an HTTP RESPONSE message to an earlier received long-polling GET request. Alternatively, the message may be a further content added to a pending HTTP streaming response message, a HTML5 Server-Sent Event message, a WebSockets channel message, or other web protocol message used to communicate the "open content item" instruction to the second electronic device.

At optional block 540, the first electronic device may receive a confirmation from the second electronic device that the "open content item" instruction was processed or that the content item has been opened at the second electronic device. In the example of Comet long-polling, the first electronic device may receive a further HTTP GET request from the second electronic device so that there is a pending request for use as a subsequent push-notification from the first electronic device to the second electronic device.

Figure 6:
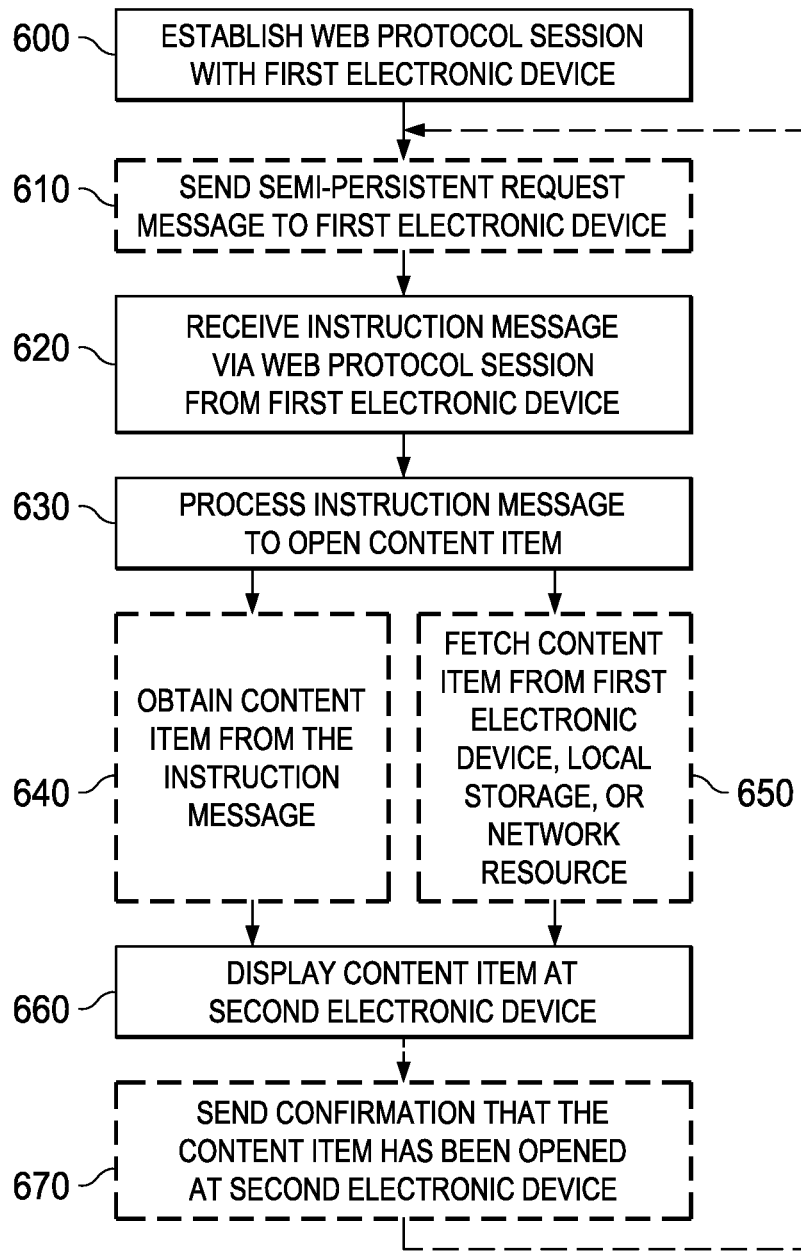
FIG. 6 is a flowchart illustrating a method performed by a client electronic device in accordance with an embodiment in the disclosure.

FIG. 6 is a flowchart diagram illustrating an example process in a second electronic device in accordance with an embodiment of the present disclosure. FIG. 6 describes some of the processing that may be performed at the second electronic device to determine the proper location for the content item. The second electronic device may operate a web client application, and function similar to the descriptions for second electronic devices 140, 210, 310*a*, 310*b*, 410.

At block 600, a web protocol session is established between the second electronic device and a first electronic device. The web protocol session may include the use of an open GET request to the first electronic device, an open RESPSONSE from the first electronic device, a WebSockets channel connection, or other mechanisms used to enable a web server operating on the first electronic device to initiate a communication (e.g. "push notification") to the second electronic device. Optional block 610 illustrates an example web protocol session in which a semi-persistent request message is sent to the first electronic device—similar to the Comet long-polling GET request described in FIG. 2.

At block 620, the second electronic device receives a message via the web protocol session. For example, the message may be an HTTP RESPONSE message to an earlier received long-polling GET request. Alternatively, the message may be a further content added to a pending HTTP streaming response message, a HTML5 Server-Sent Event message, a WebSockets channel message, or other web protocol message that indicates an "open content item" instruction from the first electronic device.

At block 630, the second electronic device processes the instruction message as an "open content item" instruction. The received instruction message may include an explicit instruction to open a content item, may identify a content item to open, and/or may include a content item to open. In one embodiment, the received instruction message includes a location of the content item, such as a URI. The URI may have a path location and file name associated with the content item. It should be understood that the URI may be referred to as a Uniform Resource Locator (URL), web link, or simply "link" in some web-related references. For consistency, the term URI in this disclosure is intended to include related terminology, or any term that represents an identification of a content item.

The URI may take several forms, such as a URI to content that is stored on the first electronic device, a URI to content that is stored on a network, or a URI to content that is stored at the second electronic device. When processing the message, the second electronic device determines whether the received instruction message includes the content item in the message itself, or whether the message identifies the content item for subsequent retrieval by the second electronic device. At optional block 640, the second electronic device may obtain the content item directly from the message if the content item was included in the message. At optional block 650, the second electronic device may fetch or otherwise obtain the content item if the message included a URI or other location identification for the content item.

If the URI is a relative URI (for example, it may begin with the character '/') then the second electronic device may further analyze or process the URI to determine where to obtain the content item. For example, the relative URI may indicate a virtual file system mapped at the second electronic device. Alternatively, the relative URI may indicate the path of a content item in a known storage file path at either the first or second electronic device. In a further alternative, the relative URI may indicate a location relative to the pending web protocol session, so that the second electronic device may further request the content item from the first electronic device via the web protocol session. It may be necessary for the second electronic device to alter the relative URI (such as replacing invalid characters, adding a "http://" prefix, or including additional parameters to the URI) to form the URI into a fully qualified URL to the content item. If the URI is not a relative URI, the second electronic device may fetch the content item using the URI by sending appropriate web protocol messages to the server identified in the URI. The URI may indicate a location for the content item at the web server located at the first electronic device or at a web server located on another machine connected via a network.

In one embodiment, the URI may be used with a local proxy server that is running at the second electronic device. The local proxy server may be configured to simulate a web server and may transform the URI into appropriate web requests to the content item located elsewhere. For example, the second electronic device may "present" the URI (or file system path) to an application launcher at the second electronic device, which launches an application that is registered to handle that URI (or file system path). As examples, in the case of an URI that begins with "http://127.0.0.1:187/messages/" the application launcher may be configured to launch a "messages" application at the second electronic device; in the case of an URI that begins with "http://127.0.0.1:187/calendar/" the application launcher may be configured to launch the "calendar" application at the second electronic device. As further example, in the case of other URIs that begin with "http://" the application launcher may be configured to launch a web browser application in the foreground. As yet another example, if the URI includes a file system path, the application launcher may be configured to look at the extension of the file and launch an appropriate application to handle it.

At block 660, the content item is displayed by the second electronic device. It should be understood that "displaying" the content item may include generating audio output, visual output for an external display, opening an operating-system-generated window, or other output for presenting the content item for interaction by a user of the second electronic device. At optional block 670, the second electronic device may send a confirmation message to the first electronic device. The confirmation message may indicate that the content item has been successfully opened (e.g. displayed) at the second electronic device.

The first electronic device or second electronic device described above may include a processing component that is capable of executing computer-readable instructions related to the actions described above.

Figure 7:
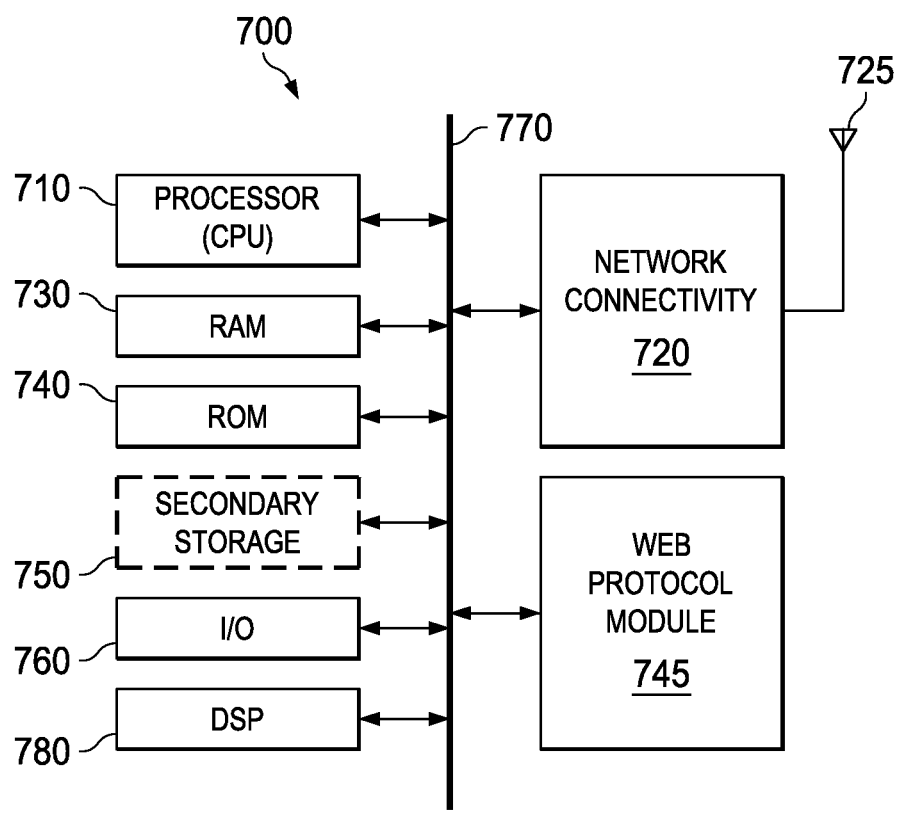
FIG. 7 is a block diagram of an example electronic device in accordance with an embodiment in the disclosure.

FIG. 7 illustrates an example embodiment of an apparatus 700 that may be configured to operate as an electronic device (e.g., first electronic devices 100, 200, 300, 400 or second electronic devices 140, 210, 310*a*, 310*b*, 410) which includes a processing component 710 suitable for implementing one or more of the embodiments earlier described herein. In addition to the processor 710 (which may be referred to as a central processor unit or CPU), the apparatus 700 may include network connectivity devices 720, random access memory (RAM) 730, read only memory (ROM) 740, secondary storage 750, and input/output (I/O) devices 760. These components may communicate with one another via a bus 770. In some cases, some of these components may not be present or may be combined in various combinations with one another or with other components not shown. These components may be located in a single physical entity or in more than one physical entity. Any actions described herein as being taken by the processor 710 might be taken by the processor 710 alone or by the processor 710 in conjunction with one or more components shown or not shown in the drawing, such as a digital signal processor (DSP) 780. Although the DSP 780, is shown as a separate component, the DSP 780 may be incorporated into the processor 710.

The processor 710 executes instructions, logic, codes, computer programs, or scripts that it may access from the network connectivity devices 720, RAM 730, ROM 740, or secondary storage 750 (which might include various disk-based systems such as hard disk, floppy disk, or optical disk). In one embodiment, a computer readable medium may store computer readable instructions, which when executed by the processor 710, cause the processor to perform according to a method, flowchart or message flow described in this disclosure. While only one processor 710 is shown, multiple processors may be present. Thus, while instructions may be discussed as being executed by a processor, the instructions may be executed simultaneously, serially, or otherwise by one or multiple processors. The processor 710 may, for example, be implemented as one or more processor chips or modules.

The network connectivity devices 720 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, short-range radio frequency devices (e.g. BlueTooth™ or NFC) and/or other well-known devices for connecting to networks. These network connectivity devices 720 may enable the processor 710 to communicate with another electronic device. The network connectivity devices 720 might also include one or more transceiver components 725 capable of transmitting and/or receiving data wirelessly.

The RAM 730 might be used to store volatile data and perhaps to store instructions that are executed by the processor 710. The ROM 740 is a non-volatile memory device that in some cases has a smaller memory capacity than the memory capacity of the secondary storage 750. ROM 740 might be used to store instructions and perhaps data that are read during execution of the instructions. Access to both RAM 730 and ROM 740 is typically faster than to secondary storage 750. The secondary storage 750 is typically comprised of one or more disk drives or tape drives and might be used for non-volatile storage of data or as an over-flow data storage device if RAM 730 is not large enough to hold all working data. However, the secondary storage 750 could be implemented using any appropriate storage technology, including so-called "solid state disk", FLASH, EEPROM, or other generally non-volatile or persistent storage. Secondary storage 750 may be used to store programs that are loaded into RAM 730 when such programs are selected for execution.

The I/O devices 760 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 725 might be considered to be a component of the I/O devices 760 instead of or in addition to being a component of the network connectivity devices 720. Some or all of the I/O devices 760 may be substantially similar to various components depicted in the previously described drawing of the first electronic device 100, such as the display 110 and the input 116.

A web protocol module 745 may also be included in the apparatus 700, either as a standalone component or as software executed in coordination with processor 710. The web protocol module 745 may be used to implement either the web server application, the web client application, the local proxy application and/or the application launcher previously described herein.

While the examples included herein are meant for illustrative purposes, the scope of the disclosure should not be limited by the examples. For example, the example of an email or an email attachment as a content item are only examples. It is contemplated that a content item "opened" at a second device may include any one of a number of data representations. Examples of content items might include emails, contact records, electronic documents, images, videos, audio files, spreadsheets, media attachments, electronic books, XML or RSS data, as well as other data representations known to persons of skill in the art.

The steps, processes, or operations described herein are examples. There may be many variations to these steps or operations without departing from the scope of this disclosure, including the following claims and accompanying diagrams. For instance, where appropriate, the steps may be performed in a differing order, or steps may be added, deleted, or modified. The present disclosure may be embodied in other specific forms without departing from its scope or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   establishing a web protocol session between a first electronic user device and a second electronic user device via a direct radio frequency connection between the first electronic user device and the second electronic user device, wherein the first electronic user device and the second electronic user device are associated with a same user;
   receiving, from a first application executing on the first electronic user device via the web protocol session, a request at a web server executing on the second electronic user device;
   in response to detecting selection of a user-interface command associated with content displayed on the second electronic user device, sending, from the web server to the first application executing on the first electronic user device, a response to the request, wherein the response includes an instruction to open a second application and to retrieve and display the content with the second application on the first electronic user device.

2. The method of claim 1, wherein a first quantity of features are displayed in the content at the second electronic user device, wherein a second quantity of features are displayed in the content at the first electronic user device, wherein the first quantity is less than the second quantity.

3. The method of claim 1, further comprising sending, to a third electronic user device, an instruction to retrieve and display the content on the third electronic user device simultaneous with the display of the content at the first electronic user device.

4. The method of claim 1, wherein the instruction includes a Uniform Resource Identifier (URI) associated with the content and wherein the URI causes the first electronic user device to retrieve the content from a third electronic user device.

5. The method of claim 1, wherein the request is a hypertext transport protocol GET request.

6. The method of claim 1, wherein the request is at least one of an open GET or a long-polling request message.

7. The method of claim 1, wherein the web protocol session utilizes at least one of hypertext transfer protocol, SPeeDY protocol, or WebSockets protocol.

8. The method of claim 1, wherein withholding the response to the request until the user-interface command is detected.

9. A computer-readable storage device having computer-readable code executable by at least one processor of the second electronic user device to perform the method of claim 1.

10. A second electronic user device comprising:
a display;
a processor coupled to the display and configured to:
    display content on the display;
    execute a web server;
    establish a web protocol session with a first electronic user device via a direct radio frequency connection between the first electronic user device and the second electronic user device, wherein the first electronic user device and the second electronic user device are associated with a same user;
    receive, from a first application executing on the first electronic user device, via the web protocol session, a request at the web server executing on the second electronic user device;
    in response to detecting selection of a user-interface command associated with the content displayed on the second electronic user device, send, from the web server to the first application executing on the first electronic user device, a response to the request, wherein the response includes an instruction to open a second application and retrieve and display the content with the second application on the first electronic user device.

11. The second electronic user device of claim 10, wherein the second electronic user device is a mobile communications device.

12. The second electronic user device of claim 10, wherein the web protocol session is established via at least one of a Bluetooth connection, a Near Field Communication connection, or a wireless local area network connection.

13. The second electronic user device of claim 10, wherein a first quantity of features are displayed in the content at the second electronic user device, wherein a second quantity of features are displayed in the content at the first electronic user device, wherein the first quantity is less than the second quantity.

14. The second electronic user device of claim 10, further comprising sending, to a third electronic user device, an instruction to retrieve and display the content on the third electronic user device simultaneous with the display of the content at the first electronic user device.

15. The second electronic user device of claim 10, wherein the request is at least one of an open GET request or a long-polling request.

16. The second electronic user device of claim 10, wherein the processor is configured to receive a further request after sending the response.

17. A method comprising:
establishing a web protocol session between a first portable electronic user device and a second electronic user device via a wireless network connection via a direct radio frequency connection between the first portable electronic user device and the second electronic user device, wherein the first portable electronic user device and the second electronic user device are associated with a same user, wherein the first portable electronic user device is a mobile phone;
receiving, from a web client application operating on the first portable electronic user device via the web protocol session, an open-get request at a web server executing on the second electronic user device;
withholding a response to the request until selection of a user-interface command associated with content displayed on the second electronic user device is detected;
in response to detecting the selection of the user-interface command associated with the content displayed on the second electronic user device, sending, from the web server to the first electronic user device, the response to the request, wherein the response includes an instruction to open a second application to retrieve and display, on the first portable electronic user device, content of an application executing on the second electronic user device.

18. The method according to claim 17, wherein the wireless network connection is a direct wireless network connection.

19. The method according to claim 17, wherein the request is a hypertext transport protocol request.

* * * * *